United States Patent
Knowles (10) Patent No.: US 7,085,797 B2
(45) Date of Patent: Aug. 1, 2006

(54) ADDITION CIRCUIT FOR ACCUMULATING REDUNDANT BINARY NUMBERS

(75) Inventor: Simon Knowles, Bath (GB)

(73) Assignee: Broadcom Corporation, Irvine, CA (US)

( * ) Notice: Subject to any disclaimer, the term of this patent is extended or adjusted under 35 U.S.C. 154(b) by 580 days.

(21) Appl. No.: 10/082,152

(22) Filed: Feb. 26, 2002

(65) Prior Publication Data
US 2003/0163504 A1    Aug. 28, 2003

(51) Int. Cl.
*G06F 7/50* (2006.01)

(52) U.S. Cl. ...................... 708/708; 708/709

(58) Field of Classification Search ............... 708/708, 708/709
See application file for complete search history.

(56) References Cited

U.S. PATENT DOCUMENTS

| | | | | | |
|---|---|---|---|---|---|
| 4,228,520 | A | * | 10/1980 | Letteney et al. | 708/629 |
| 5,504,915 | A | * | 4/1996 | Rarick | 708/708 |
| 5,625,582 | A | * | 4/1997 | Timko | 708/708 |
| 6,035,316 | A | | 3/2000 | Peleg et al. | |
| 2001/0037442 | A1 | | 11/2001 | Ganapathy et al. | |
| 2003/0145032 | A1 | * | 7/2003 | Bradley et al. | 708/708 |

FOREIGN PATENT DOCUMENTS

EP    0 981 080    2/2000

OTHER PUBLICATIONS

Knowles, S., "A Family of Adders", *IEEE*, pp. 30-37, (1999).
European Search Report for European Application No. 03004149.5 issued on Dec. 22, 2005.
Wang, Z. et al. "*New Concepts for the Design of Carry Lookahead Adders*," Proceedings of the International Symposium on Circuits and Systems. (ISCS). Chicago, May 3-6, 1993, New York, IEEE, US, vol. 2, pp. 1837-1840.

* cited by examiner

*Primary Examiner*—D. H. Malzahn
(74) *Attorney, Agent, or Firm*—Sterne, Kessler, Goldstein & Fox PLLC (57) ABSTRACT

An addition circuit for producing a sum of four redundant binary numbers includes a 4:2 compression adder for receiving each of the operand fields of the four redundant binary numbers, and producing a first sum field and a first carry field therefrom. The addition circuit further includes a 4:3 compression adder for receiving each of the sparse carry-save fields of the four redundant binary numbers, and producing a second sum field therefrom. The addition circuit also includes a 3:2 compression adder for receiving the first sum field, the first carry field and the second sum field, and producing a third sum field and a second carry field therefrom. The third sum field and the second carry field are the final results from addition of the four redundant binary numbers.

20 Claims, 8 Drawing Sheets

ADDITION CIRCUIT FOR ACCUMULATING REDUNDANT BINARY NUMBERS

FIELD OF INVENTION

The present invention relates to multiplier accumulator circuits (hereinafter referred to as "MACs"), and more particularly, to MACs that provide optimized performance for specific redundant binary data formats.

BACKGROUND OF THE INVENTION

A MAC is a circuit structure that may be utilized by a microprocessor or other data processing device to sequentially multiply a string of binary numbers, and accumulate the resulting products. Although the microprocessor can usually perform such a multiply-accumulate operation with its own internal resources, it typically takes a relatively large number of instruction cycles to do so. By employing a MAC, the processor can multiply and accumulate the results at a much higher rate, depending upon the architecture of the MAC.

Figure 1:
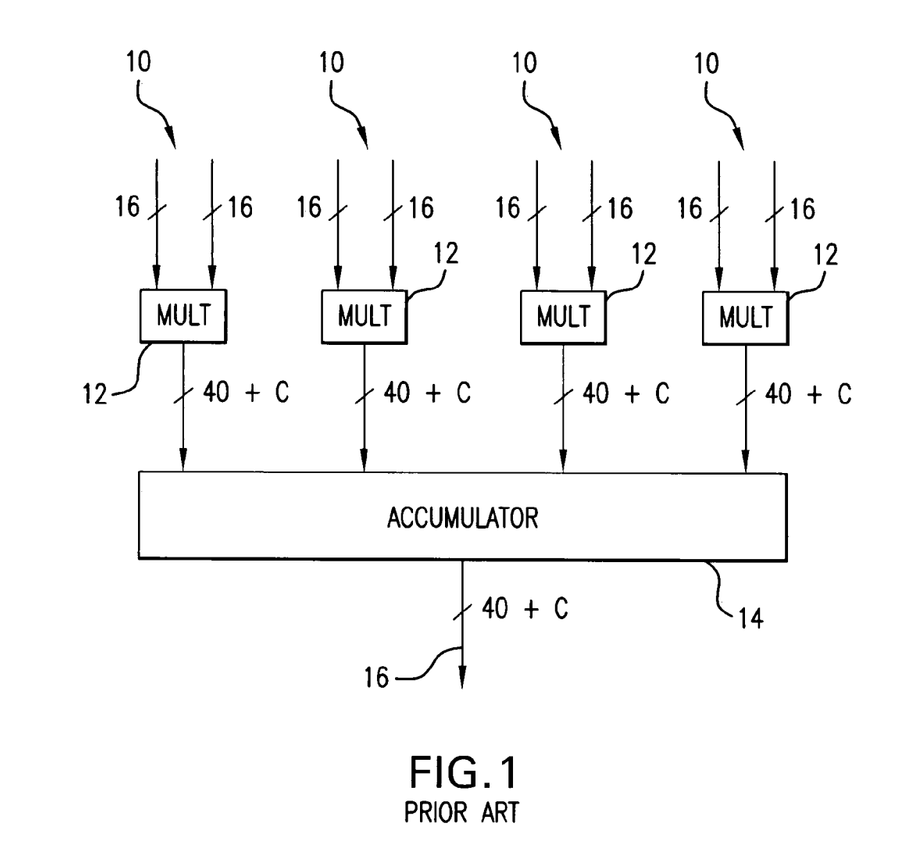
FIG. 1 illustrates four lanes of a single instruction, multiple data (SIMD) processing architecture.

Prior art MACs are typically designed as general-purpose tools that can handle common data formats and widths. Such devices necessarily provide this flexibility at the cost of processing efficiency. A disadvantage in using these general-purpose MAC devices is that they are not optimized to the unique characteristics of specific data applications. For example, FIG. 1 illustrates one specific data processing architecture that can not be optimally handled by a general purpose MAC. FIG. 1 represents four lanes of a single instruction, multiple data (SIMD) processing architecture. In each lane 10, a multiplier 12 multiplies two 16-bit numbers. The multiplier 12 represents the multiplication product with a 40-bit number (32 bits for the maximum product, plus 8 extra bits for subsequent summation overflow). An accumulator 14 receives the four 40-bit products and produces a single 40-bit number 16 that represents the sum of the four 40-bit products. In other words, the accumulator 14 adds across the four SIMD lanes to produce a single sum as an output. Although not shown, the output of the accumulator 14 may propagate to a registered accumulator that adds the current output of the accumulator 14 to the registered result of the previous N samples of the accumulator 14, and then registers the result for the next iteration.

To increase processing efficiency, the 40-bit numbers in this example are represented in radix-16 format, such that a carry-save bit for every four operand bits provides arithmetic redundancy (the data fields are shown to be 40+c wide, where the "c" represents the carry-save bits that accompany the 40 operand bits). The increase in processing efficiency, however, comes at the cost of additional storage requirements due to the extra carry-save bits. Note that the carry-save bits are sparsely distributed across the full field of 40 operand bits, so that the carry-save word field is similar in size to the 40-bit operand. As used herein, the terms "sparse" and "sparsely distributed" refers to some number of information bits (e.g., carry bits) distributed across a data field of a given width, where the total number of information bits is less than the total number of possible bit positions within that given width. A prior art technique of adding the four 40-bit numbers is shown in block diagram form in FIG. 2. A first 4:2 compression adding block 18A receives the four 40-bit operands, and a second 4:2 compression adder block 18B receives the four sets of carry-save bits. Each of the first and second 4:2 blocks 18A and 18B produces a sum field and a carry field. A third 4:2 compression adder block 18C receives the two sum fields and the two carry fields from the first and second 4:2 blocks 18A and 18B.

Figure 2:
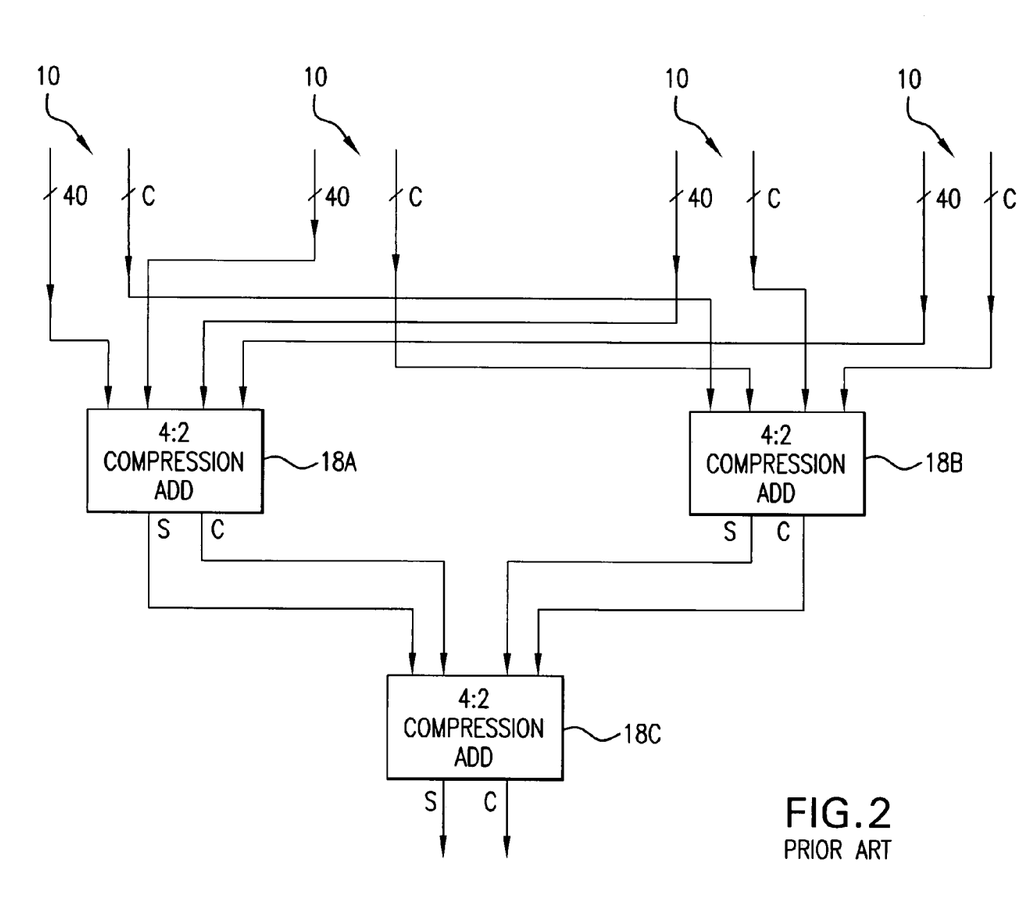
FIG. 2 shows a prior art method of adding the four 40-bit numbers.
Figure 3:
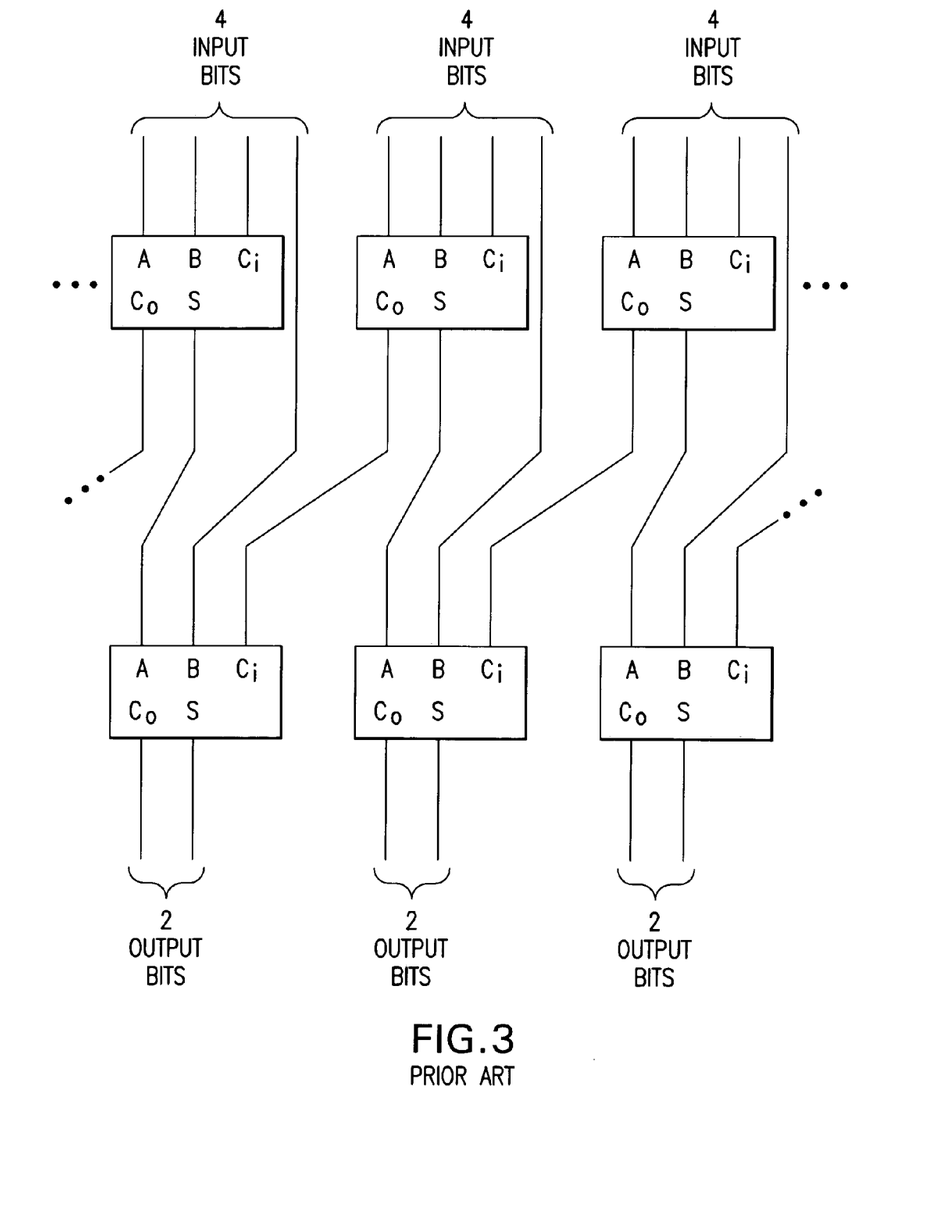
FIG. 3 shows a more detailed view of the 4:2 compression adding blocks of FIG. 2.

One of the 4:2 compression adding blocks of FIG. 2 is shown in more detail in FIG. 3. As FIG. 3 shows, a 4:2 compression adder block is simply a cascade of two full adders, which are 3:2 compression adding blocks. The delay through a 4:2 compression adding block is therefore equal to twice the delay through a full adder, and the delay through the adder tree configuration shown in FIG. 2 is equal to four times the delay through a full adder. Since a pair of numbers encounters this delay for each iteration of the MAC, any reduction in the delay would be significant when compounded by a large number of iterations through the adder tree.

SUMMARY OF THE INVENTION

One aspect of the invention comprises an addition circuit for producing a sum of four redundant binary numbers, wherein each number includes an operand field and a sparse carry-save field. The addition circuit includes a 4:2 compression adder for receiving each of the operand fields of the four redundant binary numbers, and producing a first sum field and a first carry field therefrom. The addition circuit further includes a 4:3 compression adder for receiving each of the sparse carry-save fields of the four redundant binary numbers, and producing a second sum field therefrom. The addition circuit also includes a 3:2 compression adder for receiving the first sum field, the first carry field and the second sum field, and producing a third sum field and a second carry field therefrom. The third sum field and the second carry field are the overall results from adding the four redundant binary numbers.

In another embodiment of the invention, the 4:2 compression adder includes a cascade of a first full adder and a second full adder.

In another embodiment of the invention, the 4:3 compression adder includes a binary summer for receiving four input bits of equal weight, and producing a three bit binary output word representative of the sum of the four input bits.

In another embodiment of the invention, the 3:2 compression adder includes a full adder.

In another embodiment of the invention, the 4:3 compression adder distributes bits within the second sum field so as to correspond to the significance of the sparse carry-save field.

In another embodiment of the invention, each of the four redundant binary numbers is in radix-16 format, so as to include a sparse carry-save bit for every four operand-bits.

In another aspect, the invention comprises an addition circuit for producing a sum of four redundant binary numbers, wherein each number includes an operand field and a sparse carry-save field. The addition circuit includes means for receiving each of the operand fields of the four redundant binary numbers, and producing a first sum field and a first carry field therefrom. The addition circuit further includes means for receiving each of the sparse carry-save fields of the four redundant binary numbers, and producing a second sum field therefrom. The addition circuit also includes means for receiving tile first sum field, the first carry field and the second sum field, and producing a third sum field and a second carry field therefrom. The third sum field and the second carry field are the overall results from adding the four redundant binary numbers.

In another aspect, the invention comprises a method of producing a sum of four redundant binary numbers, wherein each number includes an operand field and a sparse carry-save field. The method includes receiving each of the operand fields of the four redundant binary numbers, and producing a first sum field and a first carry field therefrom. The method also includes receiving each of the carry-save fields of the four redundant binary numbers, and producing a second sum field therefrom. The method also includes receiving the first sum field, the first carry field and the second sum field, and producing a third sum field and a second carry field therefrom. The third sum field and the second carry field is the sum of the four redundant binary numbers.

In another embodiment, the method further includes using a 4:2 compression adder to produce the first sum field and the first carry field.

In another embodiment, the method further includes using a 4:3 compression adder to produce the second sum field.

In another embodiment, the method further includes using a 3:2 compression adder to produce the third sum field and the second carry field.

In another embodiment, the method further includes distributing bits within the second sum field so as to correspond to the significance of bits within the sparse carry-save field.

In another aspect, the invention comprises a method of producing a sum of at least two redundant binary numbers, wherein each number includes an operand field and a sparse carry-save field. The method includes receiving each of the operand fields of the at least two redundant binary numbers, and producing a first sum field and a first carry field therefrom. The method also includes receiving each of the sparse carry-save fields of the four redundant binary numbers, and producing a second sum field therefrom. The distribution of bits within the second sum field corresponds to a sparse distribution within the sparse carry-save fields. The method also includes receiving the first sum field, the first carry field and the second sum field, and producing a third sum field and a second carry field therefrom. The third sum field and the second carry field is the sum of the four redundant binary numbers.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 4:
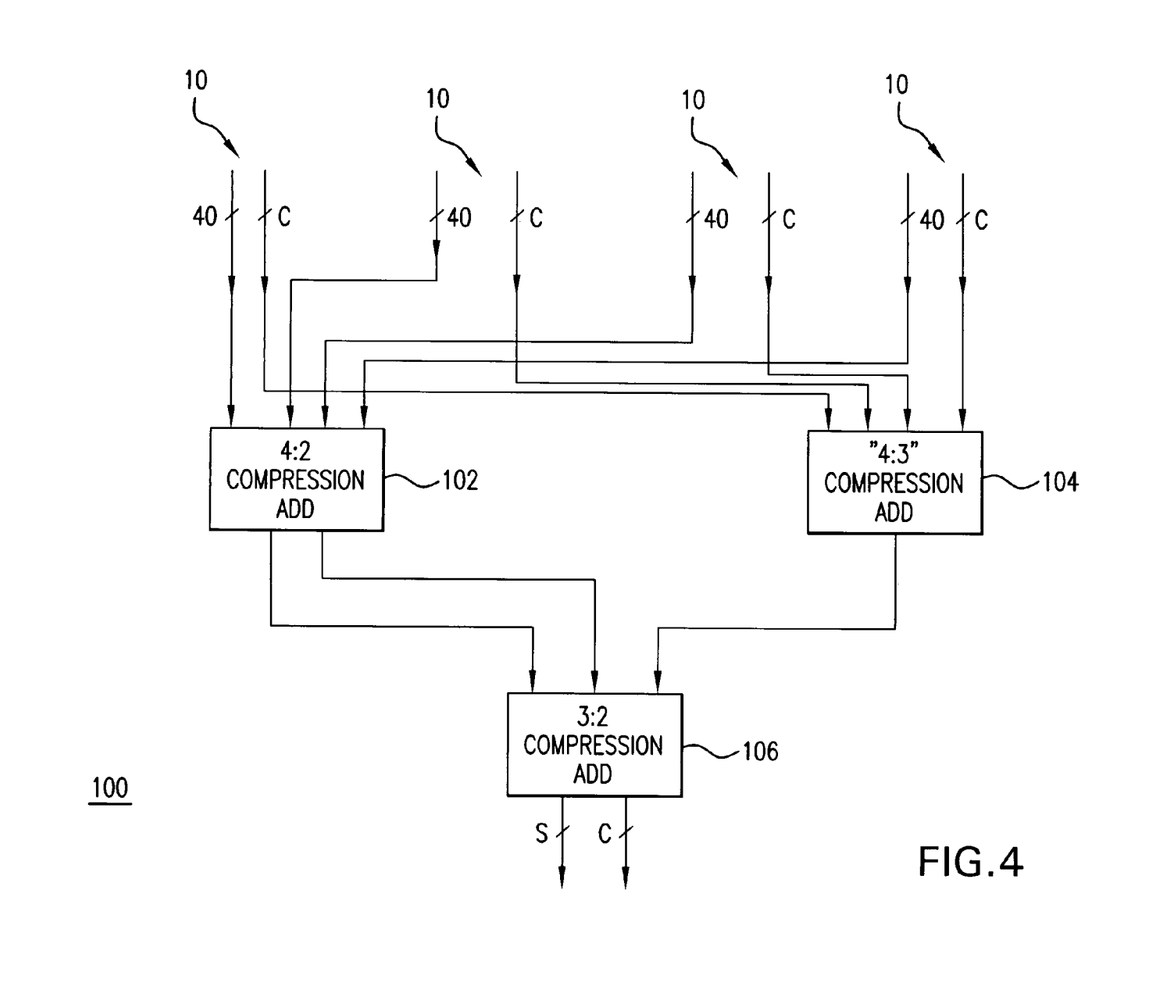
FIG. 4 shows a block diagram view of one preferred embodiment of an accumulator according to the present invention.

FIG. 4 shows a block diagram view of one preferred embodiment of an accumulator 100 according to the present invention. The accumulator 100 includes a 4:2 compression adder 102, a 4:3 compression adder 104, and a 3:2 compression adder 106. The 4:2 adder 102, shown in FIG. 3 for 4 input bits, is simply a cascade of two 3:2, compression adders with one of the input paths passing directly to the second 3:2 adder in the cascade. The 4:3 adder 104 is somewhat of a misnomer, because it does not strictly compress 4 input bits to 3 output bits. The operation of the 4:3 adder 104 is described in more detail below.

Figure 5:
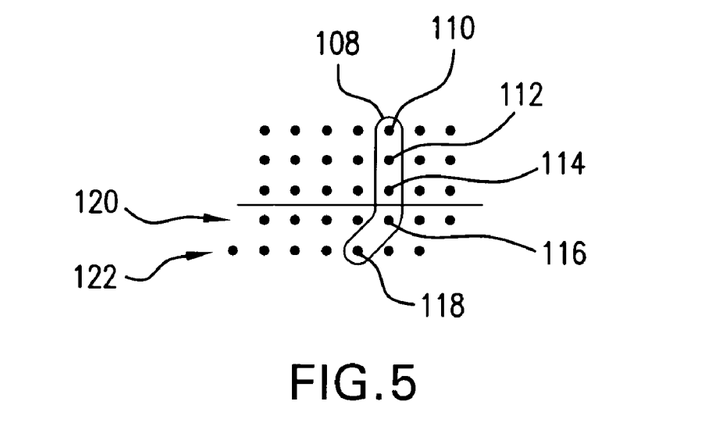
FIG. 5 illustrates the numerical operation of the 3:2 compression adder of FIG. 4.

FIG. 5 illustrates the numerical operation of a 3:2 compression adder 106. Each dot represents one binary bit, each vertical column represents bits of common significance, and each row represents bits from a given numerical word. The dots above the solid horizontal line represent input bits to the 3:2 adder, and the dots below the horizontal line represent output bits of the 3:2 adder. The circled bits 108 represent the operation of a single full adder block, i.e., a first input bit 110, a second input bit 112 and a carry-in bit 114 results in an output sum bit 116 and a carry-out bit 118. The two input bits 110 and 112, the carry-in bit 114 and the output sum bit 116 all have the same significance (i.e., in the same vertical column). The significance of the carry-out bit 118 is one position greater than the other bits. The output of the 3:2 adder thus may be represented as a sum word 120 and a carry-out word 122.

Figure 6:
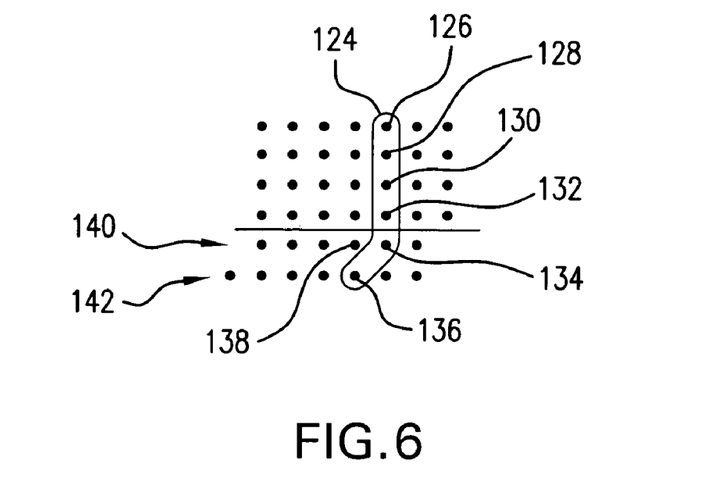
FIG. 6 illustrates the numerical operation of the 4:2 compression adder of FIG. 4.

FIG. 6 illustrates the numerical operation of a 4:2 compression adder 102. The naming convention used in FIG. 6 is the same as that described for FIG. 5. The circled bits 124 represent the operation of a single 4:2 compression block for four input bits, i.e., the four input bits 126, 128, 130 and 132 result in a sum bit 134 and a carry bit 136, although an intermediate carry can also affect the next more significant sum bit 138 (see FIG. 3). The output of the 3:2 adder thus may be represented by a sum word 140 and a carry word 142.

Figure 7:
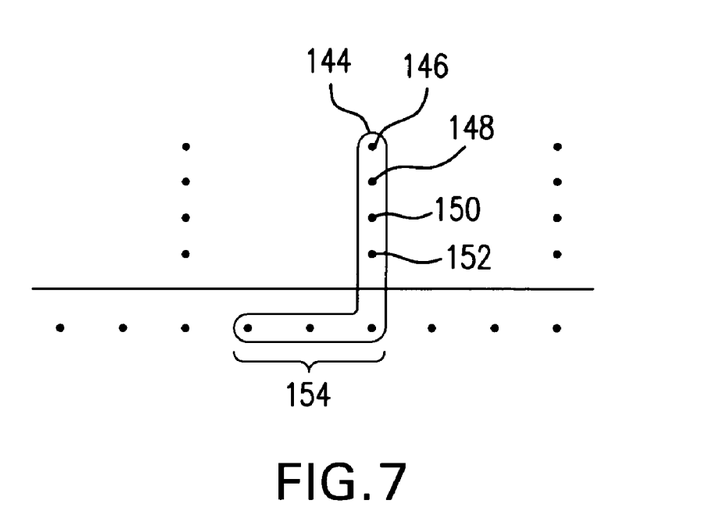
FIG. 7 illustrates the numerical operation of the 4:3 compression adder of FIG. 4.
Figure 8:
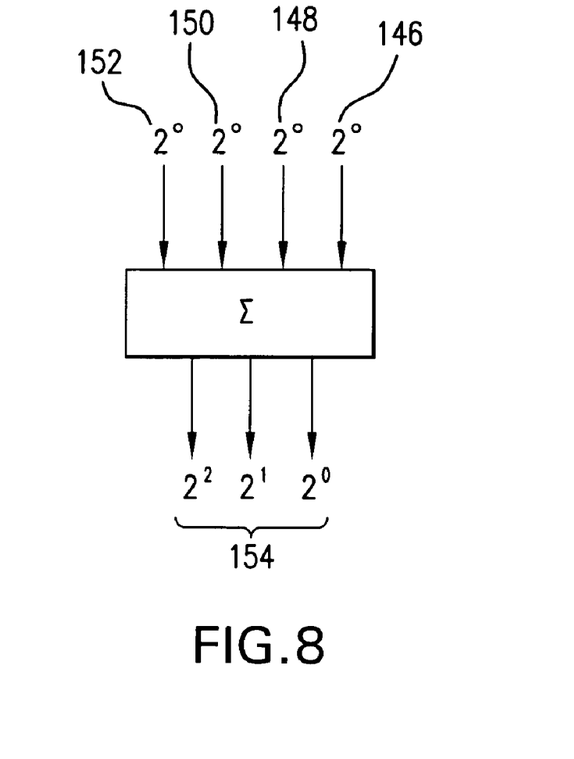
FIG. 8 provides a more detailed illustration of the 4:3 compression adder of FIG. 4.

FIG. 7 illustrates the numerical operation of the 4:3 compression adder 104, and FIG. 8 provides a more detailed illustration of the 4:3 compression adder 104. The naming convention used in FIG. 7 is the same as that described for FIG. 5. The circled bits 144 represent the operation of a single 4:2 compression block for four input bits, i.e., the four input bits 146, 148, 150 and 152 result in a three bit binary sum value. The output of the 4:3 adder thus may be represented by a single sum word 154. As shown in FIG. 8, the 4:3 adder is a simple binary summer that produces a three bit binary result where the least significant bit has the same weight as the four input bits, and the most significant bit has four times the weight of the least significant bit.

Figure 9:
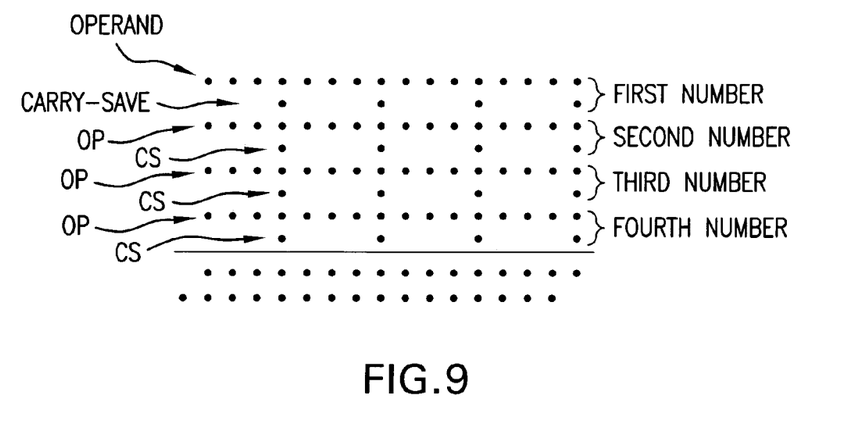
FIG. 9 shows a carry-save bit for every four operand bits for a value in radix-16 format.
Figure 10A:
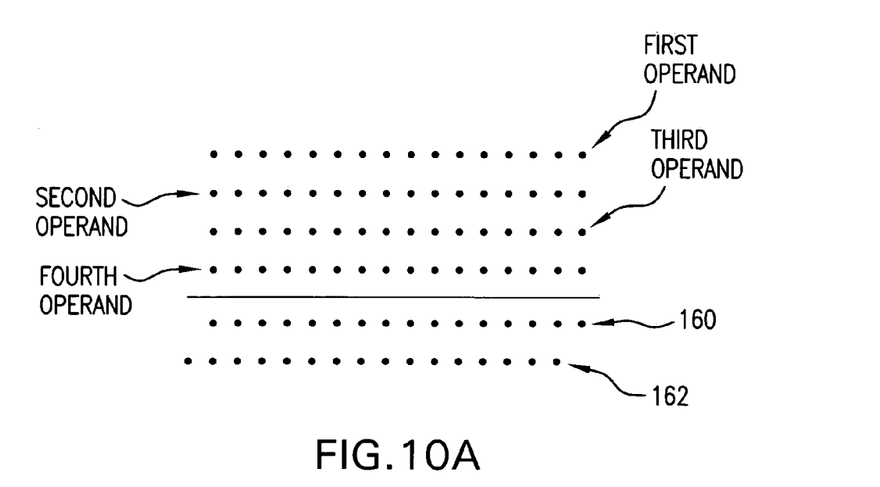
FIG. 10A shows graphically how the 4:2 compression adder of FIG. 4 produces a sum word and a carry-save word from the four operand input words.
Figure 10B:
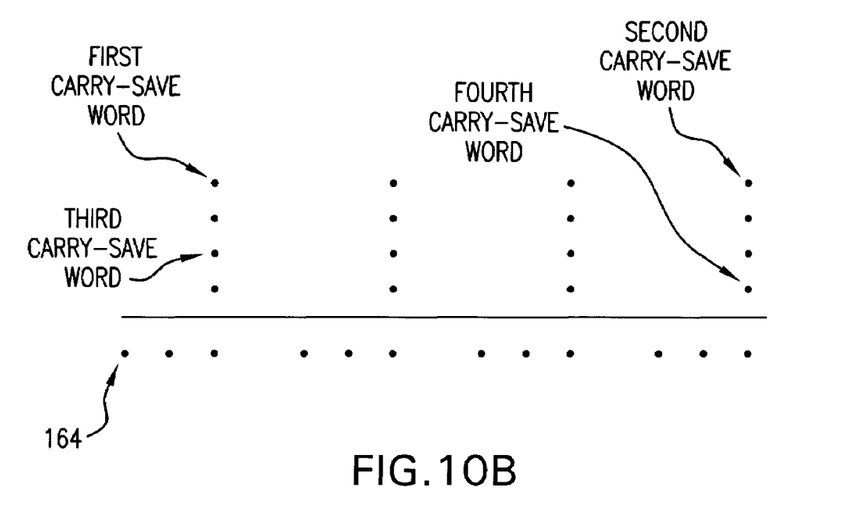
FIG. 10B shows graphically how the 4:3 compression adder of FIG. 4 produces a sum word from the four sparse carry-save input words; and, FIG. 10C shows graphically how the 3:2 compression adder of FIG. 4 produces a sum word and a carry-save word from the outputs of the 4:2 adder and the 4:3 adder.
Figure 10C:
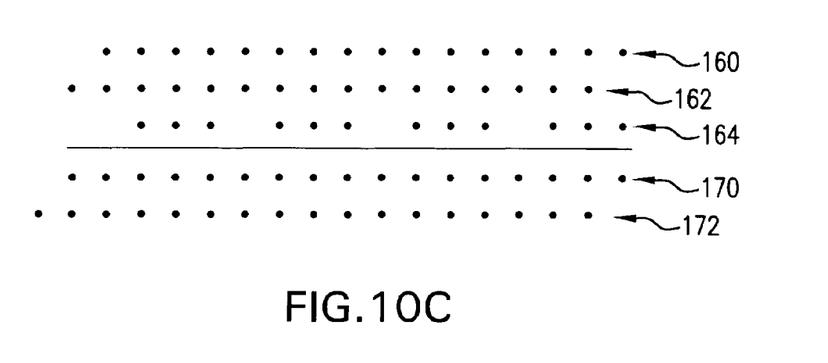

The structure of FIG. 4 may be used instead of the general accumulator architecture of FIG. 2 because of the specific radix-16 nature of the input fields. As described herein, an input value in radix-16 format includes a carry-save bit for every four operand bits, shown graphically in FIG. 9. This exemplary description uses 16 bit operands with sparse carry-save words (four bits distributed over the 16 operand bits), although other embodiments may extend this concept to other radix-16 operand widths (e.g., the 40 bit operands described herein). FIG. 10A shows graphically how the 4:2 compression adder 102 of FIG. 4 produces a sum word 160 and a carry-save word 162 from the four operand input words shown in FIG. 9. FIG. 10B shows graphically how the 4:3 compression adder 104 of FIG. 4 produces a sum word 164 from the four sparse carry-save input words shown in FIG. 9. FIG. 10C shows graphically how the 3:2 compression adder 106 of FIG. 4 produces a sum word 170 and a carry-save word 172 from the outputs of the 4:2 adder 102 and the 4:3 adder 104 of FIGS. 10A and 10B. Note that this technique works because the number of bits in the sum word 160 (i.e., three in this example) is less than or equal to the interval between the sparse bits (i.e., 4 in this example). This technique will therefore work for any numerical format in which the number of bits in the sum of the sparse words is less than or equal to the interval between the sparse bits. The interval between the sparse bits therefore defines the number of sparse words, since the number of sparse words to be summed defines the number of bits in the sum word.

The delay through the 4:2 compression adder 102 is greater than the delay through the 4:3 compression adder 104. The sum of the delay through the 4:2 adder 102 and the 3:2 adder 106 thus determines the overall delay through the accumulator 100 of FIG. 4. Since the 4:2 adder 102 includes two full sum adder delays, and the 3:2 adder 106 includes one full sum adder delay, the overall delay through the accumulator 100 is approximately three full sum adder delays. As described herein, the delay through the prior art adder tree shown in FIG. 2 is approximately four full adder delays. The accumulator 100 thus reduces the total delay with respect to the adder tree of FIG. 2 by approximately 25 percent (i.e., by one full adder delay). Such a reduction in throughput delay can be significant, especially when the accumulator is incorporated in an iterative application.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An addition circuit for producing a sum of four redundant binary numbers, wherein each number includes an operand field and a sparse carry-save field, comprising:
    a 4:2 compression adder for receiving each of the operand fields of the four redundant binary numbers, and producing a first sum field and a first carry field therefrom;
    a 4:3 compression adder for receiving each of the sparse carry-save fields of the four redundant binary numbers, and producing a second sum field therefrom;
    a 3:2 compression adder for receiving the first sum field, the first carry field and the second sum field, and producing a third sum field and a second carry field therefrom;
    wherein the third sum field and the second carry field are the sum of the four redundant binary numbers.

2. An addition circuit according to claim 1, wherein the 4:2 compression adder includes a cascade of a first full adder and a second full adder.

3. An addition circuit according to claim 1, wherein the 4:3 compression adder includes a binary summer for receiving four input bits of equal weight, and producing a three bit binary output word representative of the sum of the four input bits.

4. An addition circuit according to claim 1, wherein the 3:2 compression adder includes a full adder.

5. An addition circuit according to claim 1, wherein the 4:3 compression adder distributes bits within the second sum field so as to correspond to the significance of the sparse carry-save field.

6. An addition circuit according to claim 1, wherein each of the four redundant binary numbers is in radix-16 format, so as to include a sparse carry-save bit for every four operand bits.

7. An addition circuit for producing a sum of four redundant binary numbers, wherein each number includes an operand field and a sparse carry-save field, comprising:
    means for receiving each of the operand fields of the four redundant binary numbers, and producing a first sum field and a first carry field therefrom;
    means for receiving each of the sparse carry-save fields of the four redundant binary numbers, and producing a second sum field therefrom;
    means for receiving the first sum field, the first carry field and the second sum field, and producing a third sum field and a second carry field therefrom;
    wherein the third sum field and the second carry field are the sum of the four redundant binary numbers.

8. An addition circuit according to claim 7, wherein the means for receiving each of the operand fields includes a cascade of a first full adder and a second full adder.

9. An addition circuit according to claim 7, wherein the means for receiving each of the carry-save fields includes a binary summer for receiving four input bits of equal weight, and producing a three bit binary output word representative of the sum of the four input bits.

10. An addition circuit according to claim 7, wherein the means for receiving the first sum field, the first carry field and the second sum field includes a full adder.

11. An addition circuit according to claim 7, wherein the means for receiving each of the carry-save fields distributes the second sum field so as to correspond to the significance of the sparse carry-save field.

12. An addition circuit according to claim 7, wherein each of the four redundant binary numbers is in radix-16 format, so as to include a sparse carry-save bit for every four operand bits.

13. A method of producing a sum of four redundant binary numbers, wherein each number includes an operand field and a sparse carry-save field, comprising:
    receiving each of the operand fields of the four redundant binary numbers, and producing a first sum field and a first carry field therefrom;
    receiving each of the carry-save fields of the four redundant binary numbers, and producing a second sum field therefrom;
    receiving the first sum field, the first carry field and the second sum field, and producing a third sum field and a second carry field therefrom;
    wherein the third sum field and the second carry field are the sum of the four redundant binary numbers.

14. A method according to claim 13, further including using a 4:2 compression adder to produce the first sum field and the first carry field.

15. A method according to claim 13, further including using a 4:3 compression adder to produce the second sum field.

16. A method according to claim 13, further including using a 3:2 compression adder to produce the third sum field and the second carry field.

17. A method according to claim 13, further including distributing bits within the second sum field so as to correspond to the significance of bits within the sparse carry-save field.

18. An addition circuit for producing a sum of four redundant binary numbers, wherein each number includes an operand field and a sparse carry-save field, comprising:
- a 4:2 compression adder, including a cascade of a first full adder and a second full adder, for receiving each of the operand fields of the four redundant binary numbers, and producing a first sum field and a first carry field therefrom;
- a 4:3 compression adder, including a binary summer for receiving four input bits of equal weight and producing a three bit binary output word representative of the sum of the four input bits, for receiving each of the carry-save fields of the four redundant binary numbers, and producing a second sum field therefrom;
- a 3:2 compression adder, including a full adder, for receiving the first sum field, the first carry field and the second sum field, and producing a third sum field and a second carry field therefrom;
- wherein the third sum field and the second carry field are the sum of the four redundant binary numbers.

19. A method of producing a sum of four redundant binary numbers, wherein each number includes an operand field and a sparse carry-save field, comprising:
- receiving each of the operand fields of the four redundant binary numbers, and producing, via a 4:2 compression adder, a first sum field and a first carry field therefrom;
- receiving each of the carry-save fields of the four redundant binary numbers, and producing, via a 4:3 compression adder, a second sum field therefrom;
- receiving the first sum field, the first carry field and the second sum field, and producing, via a 3:2 compression adder a third sum field and a second carry field therefrom;
- wherein the third sum field and the second carry field are the sum of the four redundant binary numbers.

20. A method of producing a sum of at least two redundant binary numbers, wherein each number includes an operand field and a sparse carry-save field, comprising:
- receiving each of the operand fields of the at least two redundant binary numbers, and producing a first sum field and a first carry field therefrom;
- receiving each of the sparse carry-save fields of the at least two redundant binary numbers, and producing a second sum field therefrom, wherein a distribution of bits within the second sum field corresponds to a sparse distribution within the sparse carry-save fields;
- receiving the first sum field, the first carry field and the second sum field, and producing a third sum field and a second carry field therefrom;
- wherein the third sum field and the second carry field are the sum of the at least two redundant binary numbers.

* * * * *